United States Patent
Yoo et al.

(10) Patent No.: US 11,727,533 B2
(45) Date of Patent: Aug. 15, 2023

(54) APPARATUS AND METHOD FOR GENERATING SUPER RESOLUTION IMAGE USING ORIENTATION ADAPTIVE PARALLEL NEURAL NETWORKS

(71) Applicant: Electronics and Telecommunications Research Institute, Daejeon (KR)

(72) Inventors: Seok Bong Yoo, Daejeon (KR); Mi Kyong Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 361 days.

(21) Appl. No.: 16/991,689

(22) Filed: Aug. 12, 2020

(65) Prior Publication Data
US 2021/0049741 A1 Feb. 18, 2021

(30) Foreign Application Priority Data
Aug. 13, 2019 (KR) .......... 10-2019-0098952

(51) Int. Cl.
*G06N 3/04* (2023.01)
*G06T 3/40* (2006.01)

(52) U.S. Cl.
CPC ............ *G06T 3/4076* (2013.01); *G06N 3/04* (2013.01)

(58) Field of Classification Search
CPC ... G06T 3/4076; G06T 3/4053; G06T 3/4046; G06T 2207/20084; G06T 2207/20081; G06T 7/74; G06T 7/248; G06T 7/337; G06T 2207/20021; G06T 5/40; G06T 3/60; G06T 3/00; G06T 5/003; G06N 3/04; G06N 3/0454; G06N 3/02; G06N 3/08; G06N 20/00; G06V 10/454; G06V 10/82;
(Continued)

(56) References Cited

U.S. PATENT DOCUMENTS
2018/0268571 A1 9/2018 Park et al.
2018/0293707 A1 10/2018 El-Khamy et al.
(Continued)

FOREIGN PATENT DOCUMENTS
KR 10-1791573 10/2017
KR 10-2019-0040586 4/2019
(Continued)

OTHER PUBLICATIONS

Dong et al. "Image super-resolution using deep convolutional networks." IEEE transactions on pattern analysis and machine intelligence 38.2: 295-307 (Year: 2015).*

*Primary Examiner* — Sumati Lefkowitz
*Assistant Examiner* — Michael Adam Shariff
(74) *Attorney, Agent, or Firm* — Kile Park Reed & Houtteman PLLC (57) ABSTRACT

A method for generating a super resolution image may comprise up-scaling an input low resolution image; determining a directivity for each patch included in the up-scaled image; selecting an orientation-specified neural network or an orientation-non-specified neural network according to the directivity of the patch; applying the selected neural network to the patch; and obtaining a super resolution image by combining one or more patches output from the orientation-specified neural network and the orientation-non-specified neural network.

20 Claims, 9 Drawing Sheets

(58) Field of Classification Search
CPC .... G06V 10/50; G06V 10/507; G06K 9/6288; G06K 9/629
See application file for complete search history.

(56) References Cited

U.S. PATENT DOCUMENTS

2019/0026538 A1   1/2019   Wang et al.
2019/0164301 A1   5/2019   Kim

FOREIGN PATENT DOCUMENTS

KR   10-2019-0048196   5/2019
KR   10-2019-0059157   5/2019

* cited by examiner

FIG. 6A ground truth

FIG. 6B bicubic (×4)

FIG. 7A
Prior Art

VDSR (x4)

FIG. 7B
Prior Art

DnCNN (x4)

FIG. 7C
Prior Art

SRMD (x4)

APPARATUS AND METHOD FOR GENERATING SUPER RESOLUTION IMAGE USING ORIENTATION ADAPTIVE PARALLEL NEURAL NETWORKS

CROSS-REFERENCE TO RELATED APPLICATIONS

This application claims priority to Korean Patent Application No. 10-2019-0098952 filed on Aug. 13, 2019 with the Korean Intellectual Property Office (KIPO), the entire contents of which are hereby incorporated by reference.

BACKGROUND

1. Technical Field

The present disclosure relates generally to an apparatus and a method for generating a super resolution image, and more specifically, to an apparatus and a method for generating a super resolution image by converting a medium/low resolution image, which is transmitted as being reduced and compressed through a scheme such as scalable video coding (SVC), into the super resolution image at a receiving end.

2. Related Art

With the development of advanced information and communication technology (ICT), a smart city in which information is acquired using various types of electronic data collection sensors and the acquired information is used to efficiently manage assets and resources is attracting attention. The use of various video devices such as closed circuit televisions (CCTVs), black boxes, etc. is essential for an intelligent video analysis platform, one of the technologies that implement the smart city.

Meanwhile, an image captured by a camera of the CCTV, black box, etc. usually has a low image quality due to a low resolution of the camera itself or lens distortion and optical blur of the camera. Additionally, when downscaling-based compression is applied at a transmitting end to transmit such the image in a limited bandwidth, a receiving end may receive a low-quality/low-resolution image with a reduced sharpness. In this reason, in order to utilize the low-quality/low-resolution image in the smart city intelligent video analysis platform which needs to perform accurate image processing and analysis using a high quality image, there is a need for a method of resolving such the problem of deterioration in the sharpness of the image, which occurs due to the optical blur and image reduction compression, etc. at an image acquisition and transceiving system.

SUMMARY

Accordingly, exemplary embodiments of the present disclosure are directed to providing a method for generating a super resolution image by using orientation adaptive parallel neural networks.

Also, exemplary embodiments of the present disclosure also are directed to providing an image generation apparatus using the above method.

According to an exemplary embodiment of the present disclosure, a method for generating a super resolution image may comprise up-scaling an input low resolution image; determining a directivity for each patch included in the up-scaled image; selecting an orientation-specified neural network or an orientation-non-specified neural network according to the directivity of the patch; applying the selected neural network to the patch; and obtaining a super resolution image by combining one or more patches output from the orientation-specified neural network and the orientation-non-specified neural network.

The applying of the selected neural network to the patch may comprise applying the orientation-specified neural network to a patch having a specific directivity.

The applying of the orientation-specified neural network to the patch having a specific directivity may comprise rotating the patch so that an orientation of the patch becomes a preconfigured orientation learned by the orientation-specified neural network; applying iterative architectures to the rotated patch; applying a fully-connected layer to a feature map output from the iterative architectures so that a size and a shape of the feature map become identical to a size and a shape of the up-scaled image; and re-converting the patch to an original orientation.

The applying of the orientation-specified neural network to the patch having a specific directivity may further comprise inserting an outline to the patch before rotating the patch; and removing the outline from the patch whose angle has been reconverted to the original orientation.

The orientation-specified neural network may include neural network parameters learned using high directivity patches having a preconfigured directivity among a plurality of patches in a training image converted using bicubic interpolation.

The orientation-non-specified neural network may include neural network parameters learned using low directivity patches among a plurality of patches in a training image converted using bicubic interpolation.

The determining of the directivity for each patch included in the up-scaled image may comprise calculating a size and an orientation of a gradient for each pixel in the patch; deriving a histogram by calculating a frequency for a gradient orientation for pixels having a calculated gradient size equal to or greater than a preconfigured size; and determining the directivity of the patch as a high directivity or a low directivity according to whether a ratio of a first maximum value and a second maximum value of the frequency in the histogram is greater than or equal to a preconfigured ratio.

The selecting of the orientation-specified neural network or the orientation-non-specified neural network according to the directivity of the patch may comprise selecting the orientation-specified neural network for the patch having the high directivity; and selecting the orientation-non-specified neural network for the patch having the low directivity.

The applying of the selected neural network to the patch may comprise applying the orientation-non-specified neural network to a patch not having a specific directivity.

The applying of the orientation-non-specified neural network to the patch not having a specific directivity may comprise applying iterative architectures to the input patch; and applying a fully-connected layer to a feature map output from the iterative architectures.

The iterative architectures may include at least one layer architecture, and the layer architecture may include a convolution, a batch normalization (BN), and a rectified linear unit (ReLU), and generate a feature map of the input patch.

Furthermore, according to an exemplary embodiment of the present disclosure, a super resolution image generation apparatus may comprise a processor; and a memory storing at least one instruction executable by the processor, wherein when executed by the processor, the at least one instruction causes the processor to: up-scale an input low resolution image; determine a directivity for each patch included in the up-scaled image; select an orientation-specified neural network or an orientation-non-specified neural network according to the directivity of the patch; apply the selected neural network to the patch; and obtain a super resolution image by combining one or more patches output from the orientation-specified neural network and the orientation-non-specified neural network.

In the applying of the selected neural network to the patch, the at least one instruction may further cause the processor to apply the orientation-specified neural network to a patch having a specific directivity.

In the applying of the orientation-specified neural network to the patch having a specific directivity, the at least one instruction may further cause the processor to: rotate the patch so that an orientation of the patch becomes a preconfigured orientation learned by the orientation-specified neural network; apply iterative architectures to the rotated patch; apply a fully-connected layer to a feature map output from the iterative architectures so that a size and a shape of the feature map become identical to a size and a shape of the up-scaled image; and re-convert the patch to an original orientation.

In the applying of the orientation-specified neural network to the patch having a specific directivity, the at least one instruction may further cause the processor to: insert an outline to the patch before rotating the patch; and remove the outline from the patch whose angle has been reconverted to the original orientation.

The orientation-specified neural network may include neural network parameters learned using high directivity patches having a preconfigured directivity among a plurality of patches in a training image converted using bicubic interpolation.

The orientation-non-specified neural network may include neural network parameters learned using low directivity patches among a plurality of patches in a training image converted using bicubic interpolation.

In the determining of the directivity for each patch included in the up-scaled image, the at least one instruction may further cause the processor to: calculate a size and an orientation of a gradient for each pixel in the patch; derive a histogram by calculating a frequency for a gradient orientation for pixels having a calculated gradient size equal to or greater than a preconfigured size; and determine the directivity of the patch as a high directivity or a low directivity according to whether a ratio of a first maximum value and a second maximum value of the frequency in the histogram is greater than or equal to a preconfigured ratio.

In the applying of the selected neural network to the patch, the at least one instruction may further cause the processor to apply the orientation-non-specified neural network to a patch not having a specific directivity.

In the applying of the orientation-non-specified neural network to the patch not having a specific directivity, the at least one instruction may further cause the processor to apply iterative architectures to the input patch; and apply a fully-connected layer to a feature map output from the iterative architectures.

According to the exemplary embodiments of the present disclosure as described above, the problem of deterioration in the sharpness of the image that may occur due to optical blur and image reduction compression can be solved at the receiving end. Therefore, the exemplary embodiments of the present disclosure can improve the performance of the smart city intelligent image analysis platform that needs to perform accurate image processing and analysis using a high-quality image.

BRIEF DESCRIPTION OF DRAWINGS

Embodiments of the present disclosure will become more apparent by describing in detail embodiments of the present disclosure with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In general, existing deep neural network-based super-resolution techniques (e.g., Very Deep Super Resolution (VDSR), De-noising Convolutional Neural Network (DnCNN), Super-Resolution Network for Multiple Degradations (SRMD), etc. have a tendency to maintain the robustness of super-resolution performance for an arbitrary orientation of an input low-resolution patch by utilizing an open training data set consisting of image patches having various orientations. Contrary to the above-described tendency, in the present disclosure, it is noted that when a neural network model is trained based on a patch data set having a specific orientation, the sharpness of the input low-resolution patch for the specific orientation can be greatly improved. That is, the orientation of the patch may be an important clue to recover high-frequency components lost due to image downscaling and compression, which is useful for accurate super-resolution imaging.

Hereinafter, preferred exemplary embodiments of the present disclosure will be described in detail with reference to the accompanying drawings.

Figure 1:
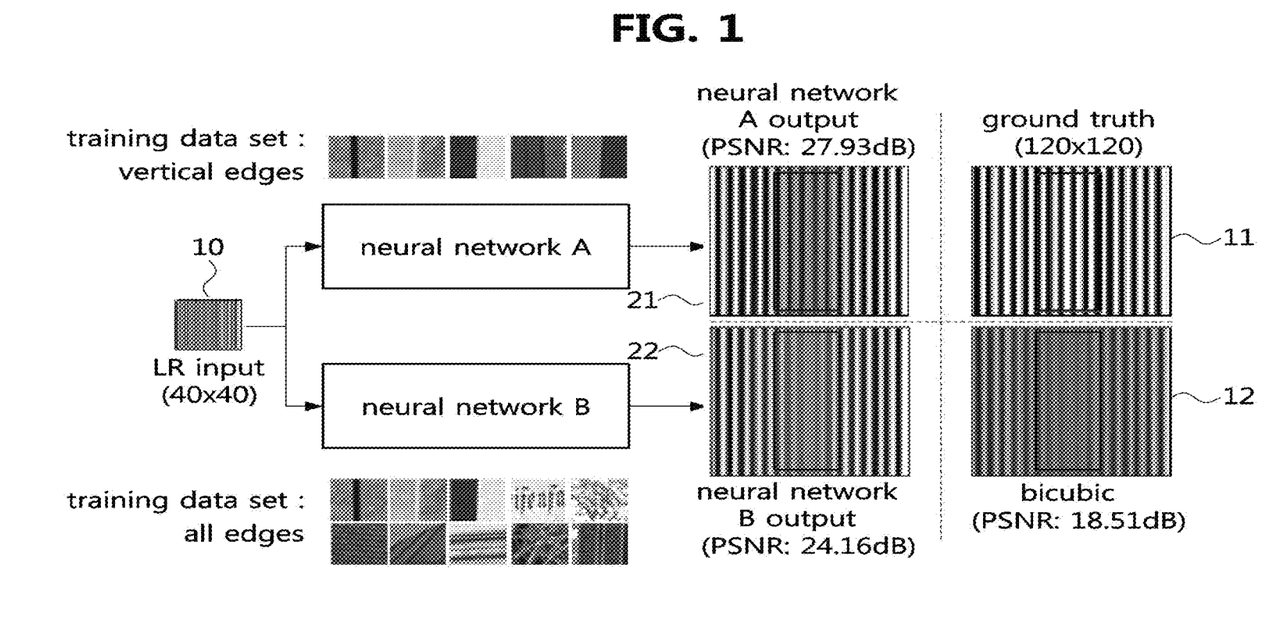
FIG. 1 is a diagram comparing results of super-resolution implementations using an orientation-specified neural network and an orientation-non-specified neural network.

FIG. 1 is a diagram comparing results of super-resolution implementations using an orientation-specified neural network and an orientation-non-specified neural network.

FIG. 1 shows results of experiments in which the DnCNN, one of the existing super-resolution techniques, is applied to a low-resolution image including a unidirectional edge (e.g., vertical edge in the example of FIG. 1) to identify an effect of patch orientation of a training data set on the super-resolution performance.

In the experiment, a neural network B was obtained by training neural network parameters using a general patch data set with various orientations as a training data set. In addition, a neural network A was obtained by training neural network parameters using a patch data set with a vertical edge (i.e., specific orientation) as a training data set.

In the experiment, a low-resolution (LR) image (e.g., 40×40) mainly including a vertical edge was input to the neural network A and neural network B trained using different data sets, respectively, and 3× up-scaling was performed vertically and horizontally with respect to the input image.

On the right side of FIG. 1, an original image 11 (e.g., 120×120), that is obtained by the 3× up-scaling on the input image, and a bicubic interpolated image 12 are compared with an image 21 output by the neural network A and an image 22 output by the neural network B.

It can be seen that the image 22 output by the neural network B has a large image quality deterioration compared to the original image 11, whereas the image 21 output by the neural network A has no significant quality deterioration compared to the original image 11. In addition, the image 21 output by the neural network A has a peak signal-to-noise ratio (PSNR) of 27.93 dB, and the image 22 output by the neural network B has a PSNR of 24.16 dB.

Such the result of the up-scaling shows that when compared with the neural network B, that is the existing orientation-non-specified network, the image output from the neural network A, that is the patch orientation-specified network, has a quality improved by 3.77 dB in terms of the PSNR value. Based on the above-described experiment, it can be seen that it is possible to improve the super-resolution performance by utilizing a network specialized for the input patch orientation.

Meanwhile, by re-training model parameters of the existing convolutional neural network (CNN) based super-resolution techniques for each orientation among all the orientations (e.g., 0 to 180 degrees), it may be possible to achieve super-resolution performance comparable to that of the exemplary embodiment of the present disclosure. However, as can be easily expected, storing a large number of models for all patch orientations not only requires a huge amount of memory, but also requires considerable computational complexity in the training process.

In order to solve the above problem, in the exemplary embodiment of the present disclosure, a neural network is trained by constructing a data set having a specific orientation, and an angle conversion in the same orientation as the constructed data set is applied to the input patch. In addition, such the angle conversion technique is combined with a deep neural network according to the present disclosure designed for super-resolution implementation. The present disclosure additionally proposes a patch orientation-non-specified neural network apparatus to maintain super-resolution performance even for patches having multiple orientations other than patches having a single orientation, and applies the proposed two neural networks (i.e., orientation-specified network and orientation-non-specified network) adaptively according to information of the input patch orientation. Accordingly, it is made possible to implement accurate super-resolution for all input patches.

Figure 2:
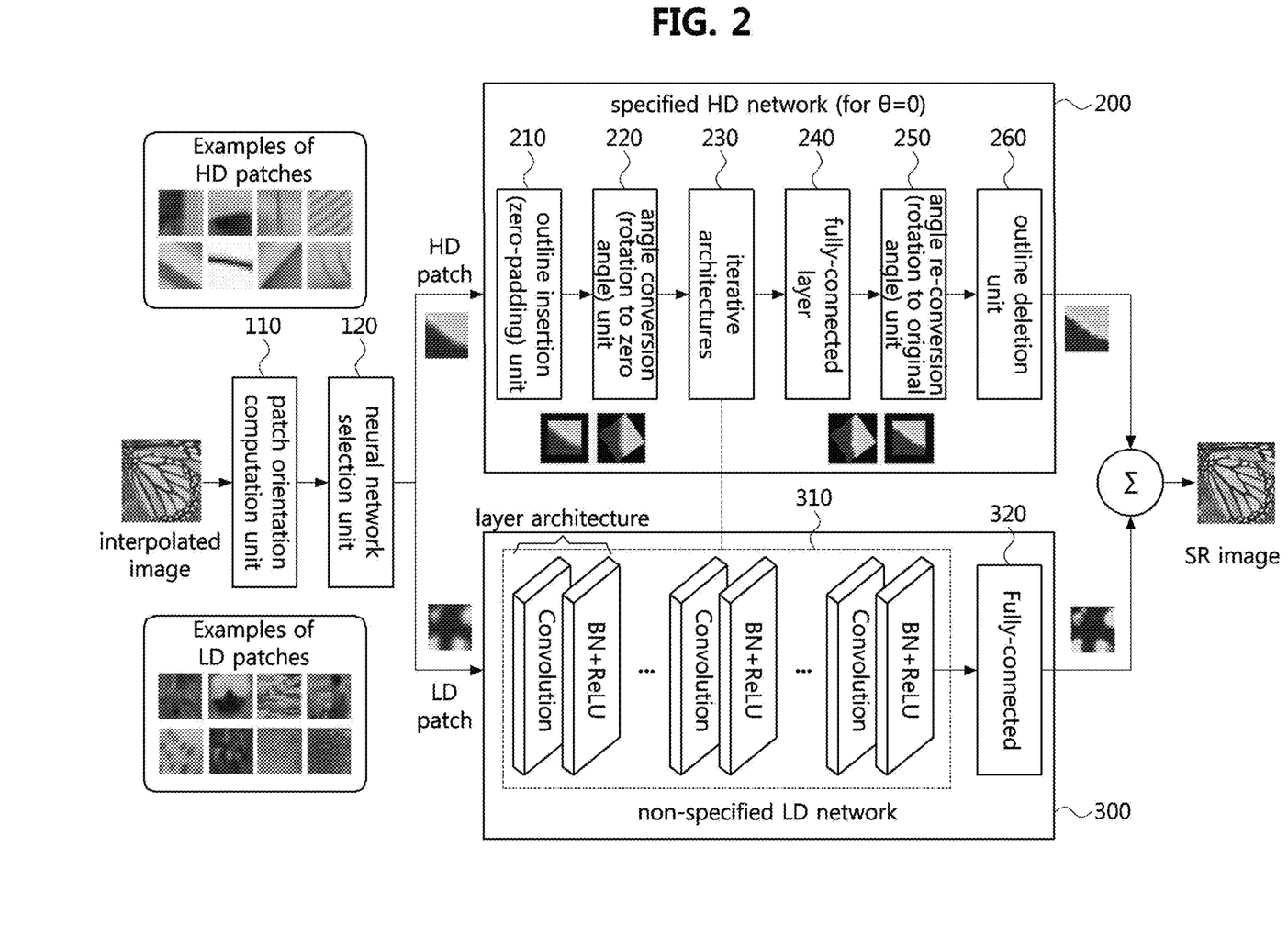
FIG. 2 is a block diagram illustrating a super-resolution image generation apparatus using patch orientation adaptive parallel neural networks according to an exemplary embodiment of the present disclosure.

FIG. 2 is a block diagram illustrating a super-resolution image generation apparatus using patch orientation adaptive parallel neural networks according to an exemplary embodiment of the present disclosure.

In the present disclosure, in order to consider both an input patch having a single orientation and an input patch having multiple orientations, a patch orientation-specified deep neural network and a patch orientation-non-specified deep neural network may be configured in parallel. The parallel type networks according to the present disclosure, that is, the neural networks may comprise an orientation-specified neural network 200 for super-resolution of an input patch with a single orientation having a high directivity (HD) and an orientation-non-specified neural network 300 for super-resolution of an input patch with multiple orientations having a low directivity (LD).

Unlike the existing super-resolution neural networks, the neural network structure according to the present disclosure may adaptively apply the proposed two neural networks to each input patch according to an orientation of the input patch. Referring to FIG. 2, the apparatus for generating a super-resolution image according to the present disclosure may further comprise a patch orientation computation unit 110 and a neural network selection unit 120 for a pre-processing for adaptive application of the neural networks to each patch in an input image.

The patch orientation computation unit 110 may calculate a size g and an orientation θ of a gradient at all pixel positions (m, n) for a patch having a size M×M in the input image by using a horizontal gradient and a vertical gradient ($g_x$, $g_y$) as in Equation 1 below.

$$g(m,n) = \sqrt{g_x^2(m,n) + g_y^2(m,n)}, \quad 1 \leq m, n \leq M$$

$$\theta(m,n) = \arctan(g_y(m,n)/g_x(m,n)), \quad 0 \leq \theta(m,n) \leq \pi. \quad \text{[Equation 1]}$$

In this case, the image input to the patch orientation computation unit 110 may be an image obtained by up-scaling a low-resolution image to a predetermined output size through bicubic interpolation. On the other hand, the neural network selection unit 120 may obtain a histogram h by calculating a frequency for a gradient orientation with respect to a pixel whose gradient size g is larger than a threshold G, as in Equation 2 below.

$$h\left(R\left(\frac{\theta(m,n)}{\delta_\theta}\right)\right) = h\left(R\left(\frac{\theta(m,n)}{\delta_\theta}\right)\right) + 1, \text{ if } g(m,n) > G \quad \text{[Equation 2]}$$

In Equation 2, $\delta_\theta$ may denote a histogram bin size, and R may denote a rounding function.

The neural network selection unit 120 may classify a patch as a HD patch when the corresponding ratio of the maximum frequency and the second maximum frequency in the acquired histogram is greater than a specific threshold. The HD patch may pass through the orientation-specified neural network and may be converted to a high resolution patch. The neural network selection unit 120 may classify a patch other than the HD patch as an LD patch and apply the orientation-non-specified neural network to the LD patch. Examples of the classified HD patches and LD patches are shown in FIG. 2.

When a neural network to be applied is selected according to the characteristics of the input image patch, the corresponding patch may be delivered to the selected neural network and processed by the neural network.

As shown in FIG. 2, the orientation-specified HD network 200 according to an exemplary embodiment of the present disclosure may include an outline insertion (i.e., outline zero-padding) unit 210, an angle conversion (i.e., rotation to zero angle) unit 220, iterative architectures 230, a fully-connected layer 240, an angle re-conversion (i.e., rotation to original angle) unit 250, and an outline deletion unit 260.

The outline insertion unit 210 may fill an outer region of a patch with a value of 0 so that the size of the patch after the padding becomes (sqrt(2)*M)×(sqrt(2)*M) for the HD patch having a size of M×M. The operation of the outline insertion unit 210 may be performed by considering in advance a radius expansion due to rotation according to the angle conversion to be followed.

The angle conversion unit 220 may rotate the patch so that the gradient orientation becomes a previously learned specific angle for a zero-padded patch having an arbitrary orientation. In particular, 0 degree may be used as the specific angle, for example.

The iterative architectures 230 may be composed of iterations of layer architectures and output a feature map for the input image. One layer architecture may include a convolution, a batch normalization (BN), and a rectified linear unit (ReLU).

The fully-connected layer 240 may return the size and shape of the feature map output from the previous step to be the same as those of the up-scaled input image.

The angle re-conversion unit 250 may re-rotate the patch having been rotated to a specific orientation through the angle conversion unit 220 to the original orientation.

The outline deletion unit 260 may obtain a high-resolution result for the HD patch by removing the region additionally inserted by the outline insertion unit to return to the original patch size (i.e., M×M).

On the other hand, the orientation non-specified neural network (i.e., non-specified LD network) 300 arranged in parallel with the orientation-specified neural network 200 may be a network that generates a high-resolution result for an LD patch having multiple orientations, and may have iterative architectures 310 and a fully-connected layer 320.

Here, the iterative architectures may basically have a structure identical to that of the orientation-specified neural network. That is, the iterative architectures 310 may be composed of iterations of a convolution, a batch normalization (BN), and a rectified linear unit (ReLU). In this case, the convolution included in the iterative architectures in the orientation-non-specified neural network may use neural network parameters previously trained only with LD patches.

Finally, the super-resolution image generation apparatus according to the present disclosure may obtain a final entire high-resolution image by adaptively selecting and combining the output of the orientation-specified neural network and the output of the orientation-non-specified neural network according to the position of the corresponding patch in the image.

Figure 3:
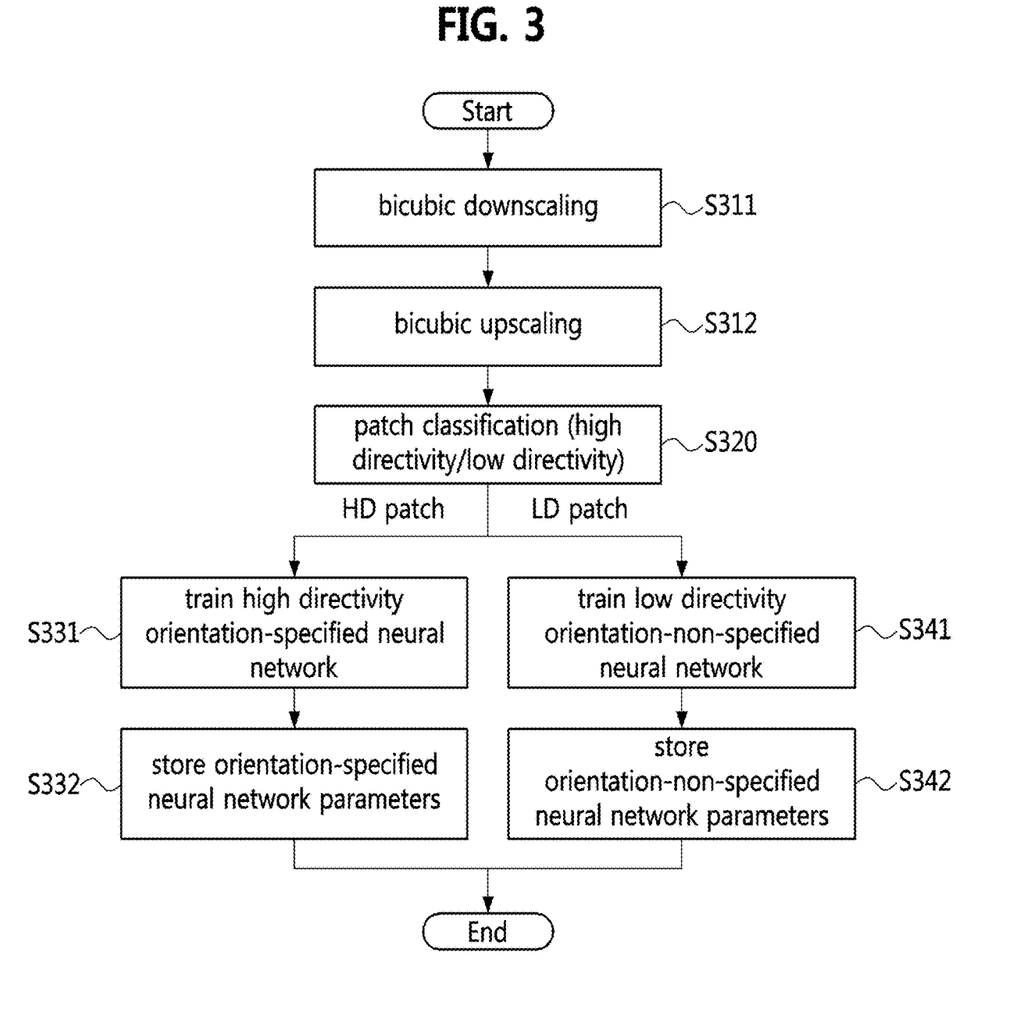
FIG. 3 is a flow chart illustrating an operation sequence according to an exemplary embodiment of a neural network training method according to the present disclosure.

FIG. 3 is a flow chart illustrating an operation sequence according to an exemplary embodiment of a neural network training method according to the present disclosure.

That is, FIG. 3 shows an operation flowchart of a method of simultaneously training the orientation-specified neural network and the orientation-non-specified neural network as described through the previous exemplary embodiment.

That is, the orientation-specified neural network and the orientation-non-specified neural network according to the present disclosure may be previously trained according to the operation shown in FIG. 3.

When a training image data set is provided, downscaling and up-scaling using bicubic interpolation may be performed using a high-resolution original image as an input (S311 and S312).

Patch classification may be performed on all patches in the image converted using the bicubic interpolation (S320). Each patch in the image may be classified as an HD patch or an LD patch, and the patch classification may be performed through the method defined through Equation 1 and Equation 2 as described above. Thereafter, the procedure for the HD patches and the procedure for the LD patches may be performed separately and simultaneously.

For a HD patch having a specific angle, orientation-specified neural network parameters may be trained so that the output of the neural network for a blurred up-scaled patch is as similar as the original (S331). Here, the specific angle may be 0 degrees. The trained parameters of the orientation-specified neural network may be stored for use in the image conversion according to the present disclosure (S332).

Similarly, for patches classified as LD patches, orientation-non-specified neural network parameters may be trained so that the output of the neural network for a blurred up-scaled patch is as similar as the original (S341). The trained parameters of the orientation-non-specified neural network may also be stored for use in the super-resolution image generation according to the present disclosure (S342).

As described above, the orientation-specified neural network parameters and the orientation-non-specified neural network parameters trained at the same time may be stored in separate memories, and a low-resolution image given in the real-time online environment may be converted into a high-resolution image through the adaptive deep neural networks according to the present disclosure.

Figure 4:
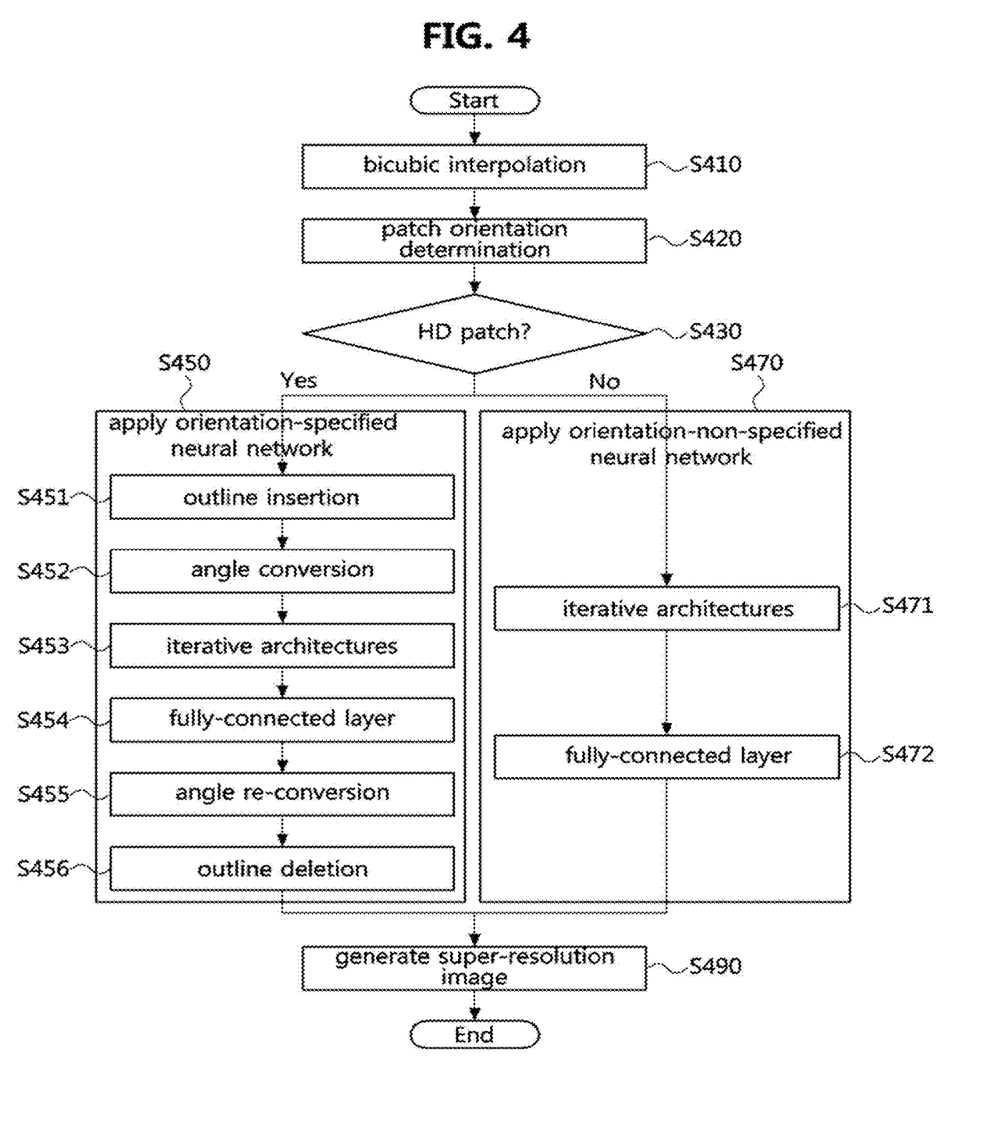
FIG. 4 is an operational flowchart for describing a super-resolution image generation method using patch orientation adaptive parallel neural networks according to the present disclosure.

FIG. 4 is an operational flowchart for describing a super-resolution image generation method using patch orientation adaptive parallel neural networks according to the present disclosure.

Hereinafter, for convenience, it will be described that the method for generating a super-resolution image shown in FIG. 4 is performed by the super-resolution image generation apparatus according to the present disclosure. However, the operation subject of the super-resolution image generation method is not limited thereto.

The super-resolution image generation apparatus according to the present disclosure may up-scale a low-resolution image input through bicubic interpolation (S410), and determine a directivity for each patch included in the up-scaled image (S420).

In this case, the step of determining the directivity of the patch may comprise a step of calculating a size and an orientation of a gradient for each pixel in the patch, a step of deriving a histogram by calculating a frequency of a gradient orientation for a pixel whose calculated gradient size is greater than or equal to a preconfigured size, and a step of determining whether the directivity of the patch is a high directivity (HD) or a low directivity (LD) according to whether a ratio of a first maximum value and a second maximum value of the frequency in the histogram is greater than or equal to a preconfigured ratio.

Depending on whether the patch is an HD patch or an LD patch, that is, depending on the directivity of the patch, the orientation-specified neural network or the orientation-non-specified neural network to be applied to the patch may be selected (S430).

For the HD patch, the orientation-specified neural network may be selected and applied (S450), and for the LD patch, the orientation-non-specified neural network may be selected and applied (S470).

In the step of applying the orientation-specified neural network to the patch having a specific directivity, that is, the HD patch, an outline may be added to the input patch (S451), and the orientation of the patch may be converted by rotating the patch so that the orientation of the patch becomes a preconfigured specific orientation trained by the orientation-specified neural network (S452). Here, the orientation-specified neural network may include neural network parameters trained by using HD patches having a predetermined directivity among a plurality of patches in a training image converted using the bicubic interpolation.

The super-resolution image generation apparatus may derive a feature map by applying the iterative architectures to the rotated patch (S453). A fully-connected layer may be applied to the feature map output from the iterative architectures to set a size and a shape of the feature map to be the same as those of the up-scaled image (S454).

Thereafter, the super-resolution image generation apparatus may re-convert the angle of the patch to the original orientation (S455), and remove the outline inserted in the step S451 (S456).

On the other hand, in the step S470 of applying the orientation-non-specified neural network to a patch not having a specific directivity (i.e., LD patch), the iterative architectures may be applied to the input LD patch (S471), and a fully-connected layer may be applied to a feature map output from the iterative architectures (S472). In this case, the orientation-non-specified neural network may be configured with neural network parameters trained using LD patches among a plurality of patches in a training image converted using the bicubic interpolation.

The iterative architectures included in the orientation-non-specified neural network may include the same structure as the iterative architectures included in the orientation-specified neural network, and operate identically to the iterative architectures included in the orientation-specified neural network. The iterative architectures may include at least one layer architecture, which includes a convolution, a batch normalization (BN), and a rectified linear unit (ReLU), and generate a feature map for the input patch.

The super-resolution image generation apparatus may obtain a super-resolution image by combining one or more patches output from the orientation-specified neural network and the orientation-non-specified neural network (S490).

Figure 5:
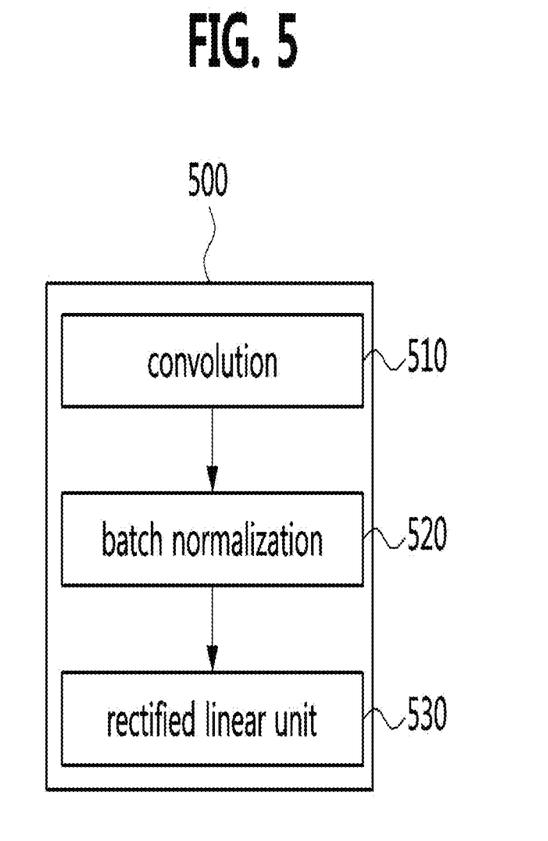
FIG. 5 is a block diagram illustrating iterative architectures according to an exemplary embodiment of the present disclosure.

FIG. 5 is a block diagram illustrating iterative architectures according to an exemplary embodiment of the present disclosure.

Referring to FIG. 5, the iterative architectures according to an exemplary embodiment of the present disclosure may comprise iteration of a layer architecture 500.

One layer architecture may consist of a convolution 510, a batch normalization (BN) 520, and a rectified linear unit (ReLU) 530. In each layer architecture, a convolution using parameters trained with HD patches having a specific orientation in advance may be performed on a patch rotated in a specific orientation. A feature map for the input patch may be generated as a result of the convolution, and the generated feature map may pass through the batch normalization 520 and the rectified linear unit 530 to increase a convergence speed and stability in the training process after the convolution.

The iterative architectures according to the present disclosure may output a final feature map by repeatedly performing the layer architectures comprising the above-mentioned convolution 510, batch normalization 520, and rectified linear unit (ReLU) 530 several times.

Figure 6A:
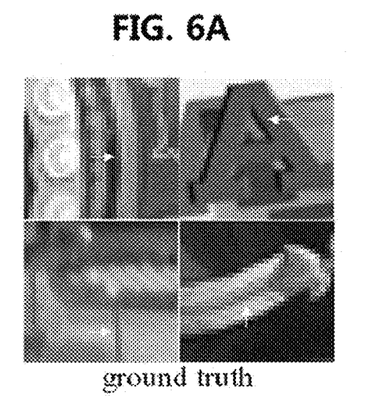
FIG. 6A shows a high-resolution original image.
Figure 6B:
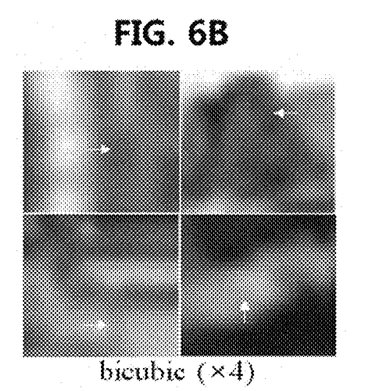
FIG. 6B shows a bicubic interpolated image having a horizontal and a vertical size four times than a low-resolution input image.
Figure 7A:
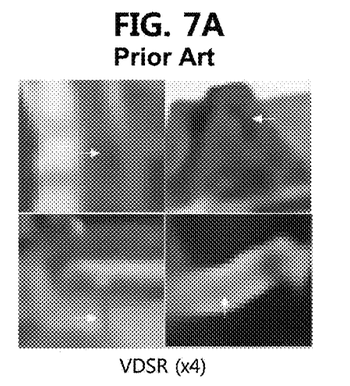
FIG. 7A shows a result of super-resolution up-scaling when the VDSR is applied for a low-resolution input image.
Figure 7B:
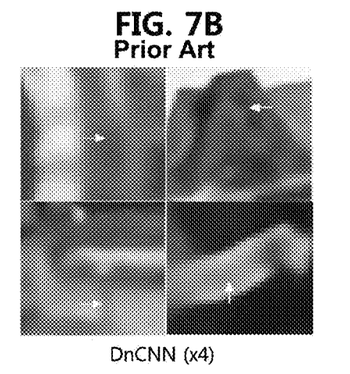
FIG. 7B shows a result of super-resolution up-scaling when the DnCNN is applied for the low-resolution input image.
Figure 7C:
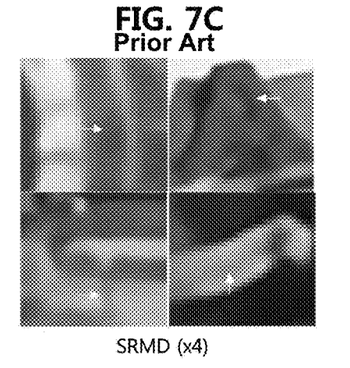
FIG. 7C shows a result of super-resolution up-scaling when the SRMD is applied for the low-resolution input image.
Figure 8:
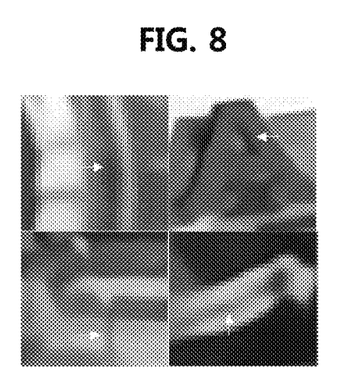
FIG. 8 shows an image obtained through the super-resolution up-scaling utilizing the adaptive parallel neural networks based on a patch orientation according to the exemplary embodiment of the present disclosure.

Through FIGS. 6 to 8, the result of super-resolution up-scaling (×4) using the adaptive parallel neural networks based on the patch orientation according to the present disclosure can be seen.

FIG. 6A shows a high-resolution original image, and FIG. 6B shows a bicubic interpolated image having a horizontal and a vertical size four times than a low-resolution input image.

FIG. 7A shows a result of super-resolution up-scaling when the VDSR is applied for a low-resolution input image, FIG. 7B shows a result of super-resolution up-scaling when the DnCNN is applied for the low-resolution input image, and FIG. 7C shows a result of super-resolution up-scaling when the SRMD is applied for the low-resolution input image.

The up-scaled images presented through FIGS. 7A to 7C are result images using the existing super-resolution neural networks, and are presented as comparative examples for the exemplary embodiment of the present disclosure.

FIG. 8 shows an image obtained through the super-resolution up-scaling utilizing the adaptive parallel neural networks based on a patch orientation according to the exemplary embodiment of the present disclosure. It can be confirmed that the image of FIG. 8 is closer to the high-resolution original (i.e., ground-truth) shown in FIG. 6A compared to the images of the existing super-resolution neural networks (FIGS. 7A to 7C), in particular, in the unidirectional edge region indicated by arrows, and it has a sharpening effect.

Figure 9:
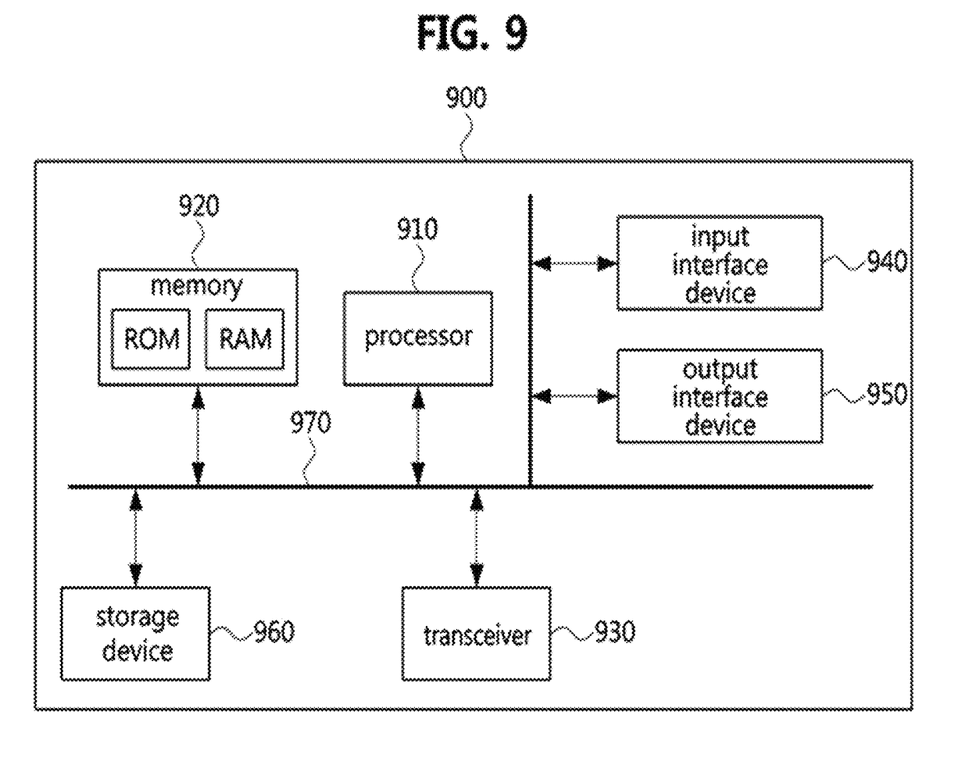
FIG. 9 is a block diagram illustrating a super-resolution image generation apparatus according to another exemplary embodiment of the present disclosure.

FIG. 9 is a block diagram illustrating a super-resolution image generation apparatus according to another exemplary embodiment of the present disclosure.

The super-resolution image generation apparatus 900 according to an exemplary embodiment of the present disclosure may comprise at least one processor 910, a memory 920 storing at least one instruction executable by the processor, and a transceiver 930 connected to a network for performing communications. Also, the super-resolution image generation apparatus 900 may further comprise an input interface device 940, an output interface device 950, a storage device 960, and the like. Each component included in the super-resolution image generation apparatus 900 may communicate with each other as connected through a bus 970.

The processor 910 may execute a program stored in at least one of the memory 920 and the storage device 960. The processor 910 may refer to a central processing unit (CPU), a graphics processing unit (GPU), or a dedicated processor on which methods in accordance with embodiments of the present disclosure are performed. Each of the memory 920 and the storage device 960 may be constituted by at least one of a volatile storage medium and a non-volatile storage medium. For example, the memory 920 may comprise at least one of read-only memory (ROM) and random access memory (RAM)

The storage device 960 may also store one or more orientation-specified neural network parameters trained by a specific angle and one or more orientation-non-specified neural network parameters.

Particularly, the at least one instruction may cause the processor to up-scale an input low resolution image; determine a directivity for each patch included in the up-scaled image; select an orientation-specified neural network or an orientation-non-specified neural network according to the directivity of the patch; apply the selected neural network to the patch; and obtain a super resolution image by combining one or more patches output from the orientation-specified neural network and the orientation-non-specified neural network.

Particularly, in the applying of the orientation-specified neural network to the patch having a specific directivity, the at least one instruction may further cause the processor to: insert an outline to the patch before rotating the patch; rotate the patch so that an orientation of the patch becomes a preconfigured orientation learned by the orientation-specified neural network; apply iterative architectures to the rotated patch; apply a fully-connected layer to a feature map output from the iterative architectures so that a size and a shape of the feature map become identical to a size and a shape of the up-scaled image; re-convert the patch to an original orientation; and remove the outline from the patch whose angle has been reconverted to the original orientation.

In the determining of the directivity for each patch included in the up-scaled image, the at least one instruction may further cause the processor to: calculate a size and an orientation of a gradient for each pixel in the patch; derive a histogram by calculating a frequency for a gradient orientation for pixels having a calculated gradient size equal to or greater than a preconfigured size; and determine the directivity of the patch as a high directivity or a low directivity according to whether a ratio of a first maximum value and a second maximum value of the frequency in the histogram is greater than or equal to a preconfigured ratio.

In the applying of the orientation-non-specified neural network to the patch not having a specific directivity, the at least one instruction may further cause the processor to apply iterative architectures to the input patch; and apply a fully-connected layer to a feature map output from the iterative architectures The present disclosure described through the above exemplary embodiments includes key elements for super-resolution imaging that are not covered by the deep learning-based prior arts.

First, the orientation-specified neural network utilizing patch orientation information and the orientation-non-specified neural network are proposed, and they are arranged in parallel and adaptively applied according to the input patch orientation. Through this, it is possible to significantly improve the super-resolution performance for the HD patch while maintaining the super-resolution performance for the LD patch.

Second, by including additional components such as the outline insertion unit and the angle conversion unit in the orientation-specified network, the neural network specified to a specific orientation (e.g., 0 degree) can be collectively applied to an HD patch that may have various orientations (e.g., 0 to 180 degrees).

Third, when a data set is given in advance, through the framework of simultaneously training the orientation-specified neural network parameters and the orientation-non-specified neural network parameters based on the patch classification and individually storing the parameters, a low-quality/low-resolution image can be successfully converted to a high resolution image by using the trained neural networks. Accordingly, by improving the sharpness of the blurred image at the receiving end, it has an effect of improving the performance of the smart city image analysis platform based on high-quality image information such as CCTVs, black boxes, etc.

The method according to the exemplary embodiments of the present disclosure may also be embodied as computer readable programs or codes on a computer readable recording medium. The computer readable recording medium is any data storage device that may store data which can be thereafter read by a computer system. The computer readable recording medium may also be distributed over network coupled computer systems so that the computer readable code is stored and executed in a distributed fashion.

In addition, examples of the computer-readable recording medium may include magnetic media such as hard discs, floppy discs, and magnetic tapes, optical media such as compact disc-read-only memories (CD-ROMs), digital video disc (DVDs), and so on, magneto-optical media such as floptical discs, and hardware devices specially configured (or designed) for storing and executing program commands, such as ROMs, random access memories (RAMs), flash memories, and so on. Examples of a program command may not only include machine language codes, which are created by a compiler, but may also include high-level language codes, which may be executed by a computer using an interpreter, and so on.

Some aspects of the present disclosure have been described in the context of an apparatus but may also represent the corresponding method. Here, a block or the apparatus corresponds to an operation of the method or a characteristic of an operation of the method. Likewise, aspects which have been described in the context of the method may be indicated by the corresponding blocks or items or characteristics of the corresponding apparatus. Some or all of operations of the method may be performed by (or using) a hardware device, such as a microprocessor, a programmable computer, or an electronic circuit. In some exemplary embodiments, one or more important steps of the method may be performed by such a device. In the exemplary embodiments of the present disclosure, a programmable logic device (e.g., a field-programmable gate array (FPGA)) may be used to perform some or all of functions of the above-described methods. In the exemplary embodiments, the FPGA may operate in combination with a microprocessor for performing one of the above-described methods. In general, the methods may be performed by any hardware device.

While the exemplary embodiments of the present disclosure and their advantages have been described in detail, it should be understood that various changes, substitutions and alterations may be made herein without departing from the scope of the disclosure.

What is claimed is:

1. A method for generating a super resolution image, the method comprising:
   up-scaling an input low resolution image;
   determining a directivity for each patch included in the up-scaled image;
   selecting an orientation-specified neural network or an orientation-non-specified neural network according to the directivity of each patch;
   applying the selected neural network to each patch; and
   obtaining a super resolution image by combining one or more of each patch output from the orientation-specified neural network or the orientation-non-specified neural network based on the selecting step.

2. The method according to claim 1, wherein the applying of the selected neural network to each patch comprises applying the orientation-specified neural network to each patch having a specific directivity.

3. The method according to claim 2, wherein the applying of the orientation-specified neural network to each patch having a specific directivity comprises:
   rotating each patch so that an orientation of each patch becomes a preconfigured orientation learned by the orientation-specified neural network;
   applying iterative architectures to each rotated patch;
   applying a fully-connected layer to a feature map output from the iterative architectures so that a size and a shape of the feature map become identical to a size and a shape of the up-scaled image; and
   re-converting each patch to an original orientation.

4. The method according to claim 3, wherein the applying of the orientation-specified neural network to the patch having a specific directivity further comprises:
   inserting an outline to the patch before rotating each patch; and
   removing the outline from each patch whose angle has been reconverted to the original orientation.

5. The method according to claim 1, wherein the orientation-specified neural network includes neural network parameters learned using high directivity patches having a preconfigured directivity among a plurality of patches in a training image converted using bicubic interpolation.

6. The method according to claim 1, wherein the orientation-non-specified neural network includes neural network parameters learned using low directivity patches among a plurality of patches in a training image converted using bicubic interpolation.

7. The method according to claim 1, wherein the determining of the directivity for each patch included in the up-scaled image comprises:
   calculating a size and an orientation of a gradient for each pixel in each patch;
   deriving a histogram by calculating a frequency for a gradient orientation for pixels having a calculated gradient size equal to or greater than a preconfigured size; and
   determining the directivity of the patch as a high directivity or a low directivity according to whether a ratio of a first maximum value and a second maximum value of the frequency in the histogram is greater than or equal to a preconfigured ratio.

8. The method according to claim 7, wherein the selecting of the orientation-specified neural network or the orientation-non-specified neural network according to the directivity of the patch comprises:
   selecting the orientation-specified neural network for each patch having the high directivity; and
   selecting the orientation-non-specified neural network for each patch having the low directivity.

9. The method according to claim 1, wherein the applying of the selected neural network to each patch comprises applying the orientation-non-specified neural network to each patch not having a specific directivity.

10. The method according to claim 9, wherein the applying of the orientation-non-specified neural network to each patch not having a specific directivity comprises:
    applying iterative architectures to an input patch; and
    applying a fully-connected layer to a feature map output from the iterative architectures.

11. The method according to claim 3, wherein the iterative architectures include at least one layer architecture, and the layer architecture includes a convolution, a batch normalization (BN), and a rectified linear unit (ReLU), and generates a feature map of the input patch.

12. A super resolution image generation apparatus, the apparatus comprising:
a processor; and
a memory storing at least one instruction executable by the processor,
wherein when executed by the processor, the at least one instruction causes the processor to:
up-scale an input low resolution image;
determine a directivity for each patch included in the up-scaled image;
select an orientation-specified neural network or an orientation-non-specified neural network according to the directivity of each patch;
apply the selected neural network to each patch; and
obtain a super resolution image by combining one or more of each patch output from the orientation-specified neural network or the orientation-non-specified neural network based on the selecting step.

13. The super resolution image generation apparatus according to claim 12, wherein in the applying of the selected neural network to each patch, the at least one instruction further causes the processor to apply the orientation-specified neural network to each patch having a specific directivity.

14. The super resolution image generation apparatus according to claim 13, wherein in the applying of the orientation-specified neural network to each patch having a specific directivity, the at least one instruction further causes the processor to:
rotate each patch so that an orientation of the patch becomes a preconfigured orientation learned by the orientation-specified neural network;
apply iterative architectures to each rotated patch;
apply a fully-connected layer to a feature map output from the iterative architectures so that a size and a shape of the feature map become identical to a size and a shape of the up-scaled image; and
re-convert each patch to an original orientation.

15. The super resolution image generation apparatus according to claim 14, wherein in the applying of the orientation-specified neural network to each patch having a specific directivity, the at least one instruction further causes the processor to:
insert an outline to each patch before rotating the patch; and
remove the outline from each patch whose angle has been reconverted to the original orientation.

16. The super resolution image generation apparatus according to claim 12, wherein the orientation-specified neural network includes neural network parameters learned using high directivity patches having a preconfigured directivity among a plurality of patches in a training image converted using bicubic interpolation.

17. The super resolution image generation apparatus according to claim 12, wherein the orientation-non-specified neural network includes neural network parameters learned using low directivity patches among a plurality of patches in a training image converted using bicubic interpolation.

18. The super resolution image generation apparatus according to claim 12, wherein in the determining of the directivity for each patch included in the up-scaled image, the at least one instruction further causes the processor to:
calculate a size and an orientation of a gradient for each pixel in each patch;
derive a histogram by calculating a frequency for a gradient orientation for pixels having a calculated gradient size equal to or greater than a preconfigured size; and
determine the directivity of each patch as a high directivity or a low directivity according to whether a ratio of a first maximum value and a second maximum value of the frequency in the histogram is greater than or equal to a preconfigured ratio.

19. The super resolution image generation apparatus according to claim 12, wherein in the applying of the selected neural network to each patch, the at least one instruction further causes the processor to apply the orientation-non-specified neural network to each patch not having a specific directivity.

20. The super resolution image generation apparatus according to claim 19, wherein in the applying of the orientation-non-specified neural network to each patch not having a specific directivity, the at least one instruction further causes the processor to apply iterative architectures to an input patch; and apply a fully-connected layer to a feature map output from the iterative architectures.

* * * * *